Patented Aug. 14, 1923.

1,464,557

UNITED STATES PATENT OFFICE.

HERMANN BOLLMANN, OF HAMBURG, GERMANY.

PROCESS OF OBTAINING LECITHIN FROM VEGETABLE RAW MATERIALS.

No Drawing.   Application filed June 10, 1922. Serial No. 567,434.

*To all whom it may concern:*

Be it known that I, HERMANN BOLLMANN, a citizen of Hamburg, Germany, residing at Hamburg, State of Germany, have invented certain new and useful Improvements in Processes of Obtaining Lecithin from Vegetable Raw Materials, of which the following is a specification.

The present invention relates to an improved process of obtaining lecithin from vegetable raw materials. The production of pure lecithin from vegetable raw materials combines considerable difficulties because the alcohol used as extracting means dissolves at the same time also bitter extractive matters, soluble carbohydrates and other constituent parts, which especially on account of the easy decomposition of the lecithin can only be separated from the latter with great difficulty. With fat-solvents such as benzol, benzine, chloroform and the like, which are likewise solvents for lecithin, it is however not possible, to remove lecithin from vegetable matters.

According to the process forming the subject-matter of the present invention it is indeed possible to obtain an undecomposed pure lecithin. This improved process depends on the one hand on the application of a solvent-mixture of alcohol and benzol or benzine which solvent-mixture has the ability or property to dissolve lecithin besides oil, free fatty acids, resinous and bitter matters from vegetable raw materials, but to leave undissolved mainly the carbohydrates soluble in alcohol. On the other hand the improved process derives advantage from the property of the lecithin of being soluble in fatty oils.

According to the present invention raw materials containing lecithin, such as vegetable seeds and their pressed cakes, are to be extracted by a mixture of alcohol and benzol or benzine. In order to retain mainly the carbohydrates, which can only be separated from lecithin with great difficulty, and yet to completely dissolve the lecithin, the solvent-mixture must contain at the least 10 per cent, but no more than 80 per cent of benzol or benzine. The most advantageous results will be obtained by using a mixture of 2 parts of alcohol and 3 parts of benzol or benzine.

The alcohol is applied in a strength of 96 vol. per cent or higher; it will be diluted by the moisture contained in the raw materials to be treated. Care, however, must be taken, that the raw materials do not contain more than 10 per cent of water, so that the alcohol comes to about 90 vol. per cent. When too great a dilution takes place, the solvent-mixture will be separated or split up into its constituent parts.

The extract thus obtained from the raw materials is warmed up until the solvent-mixture is mainly vaporized. From this, a decomposition of the lecithin need not be feared, as the oil, in which it dissolves, exerts a protective action. Such a decomposition will take place only in the case that the oil is heated more strongly, for example, by means of a trickling evaporator, in order to remove the last traces of the solvent. By such strong heating the oil turns deeply dark-brown and can not be made bright again.

After the evaporation there are remaining the oil and the free fatty acids in which the lecithin is dissolved, and furthermore small quantities of settlings or deposits which contain the bitter extractive matters, resins and other impurities. These settlings or deposits are separated from the oil and free fatty acids, whereupon water-vapor is passed into the remaining liquid in order to set free the lecithin which is then separated and freed in well known manner from any oil sticking thereto.

If there should be contained in the lecithin-ferous-containing raw materials no oil or only slight traces thereof, a fatty oil, for example, linseed-oil is added to the extract obtained from the said raw materials and this mixture then treated in the same manner as stated above.

I claim:

1. Process of obtaining lecithin from vegetable raw materials consisting in extracting the said raw materials by a solvent-mixture of alcohol and benzol, in warming up the extract thus obtained until the solvent-mixture is mainly evaporated, in separating the remaining oil from its deposit, in passing water-vapor into the oil in order to set free the lecithin, in separating the lecithin, and in freeing the latter from any oil sticking thereto.

2. Process of obtaining lecithin from vegetable raw materials consisting in extracting the said raw materials by a solvent-mixture of alcohol and volatile liquid hydrocarbon, in warming up the extract thus obtained until the solvent-mixture is mainly evaporated, in separating the remaining oil from its deposit, in passing water-vapor into the oil in order to set free the lecithin, in separating the lecithin, and in freeing the latter from any oil sticking thereto.

3. Process of obtaining lecithin from vegetable raw materials consisting in extracting the said raw materials by a solvent-mixture of alcohol and benzol, in adding a fatty oil to the extract thus obtained, in warming up this mixture until the solvent-mixture is mainly evaporated, in separating the remaining oil from the remaining deposit, in passing water-vapor into the oil in order to set free the lecithin, in separating the lecithin, and in freeing the latter from any oil sticking thereto.

4. Process of obtaining lecithin from vegetable raw materials consisting in extracting the said raw materials by a solvent-mixture of alcohol and a volatile hydrocarbon solvent, in adding a fatty oil to the extract thus obtained, in warming up this mixture until the solvent-mixture is mainly evaporated, in separating the remaining oil from the remaining deposit, in passing water-vapor into the oil in order to set free the lecithin, in separating the lecithin, and in freeing the latter from any oil sticking thereto.

5. Process of obtaining lecithin from vegetable raw materials consisting in extracting the said raw materials by a solvent-mixture of alcohol with an addition of 10 to 80 per cent of benzol, in warming up the extract thus obtained until the solvent-mixture is mainly evaporated, in separating the remaining oil from its deposit, in passing water-vapor into the oil in order to set free the lecithin, in separating the lecithin, and in freeing the latter from any oil sticking thereto.

6. Process of obtaining lecithin from vegetable raw materials consisting in extracting the said raw materials by a solvent-mixture of alcohol with an addition of 10 to 80 per cent of volatile hydrocarbon solvent, in warming up the extract thus obtained until the solvent-mixture is mainly evaporated, in separating the remaining oil from its deposit, in passing water-vapor into the oil in order to set free the lecithin, in separating the lecithin, and in freeing the latter from any oil sticking thereto.

7. Process of obtaining lecithin from vegetable raw materials consisting in extracting the said raw materials by a solvent-mixture of alcohol with an addition of 10 to 80 per cent of benzol, in adding to the extract thus obtained a fatty oil, in warming up this mixture until the solvent-mixture is mainly evaporated, in separating the remaining oil from its deposit, in passing water-vapor into the oil in order to set free the lecithin, in separating the lecithin, and in freeing the latter from any oil sticking thereto.

8. Process of obtaining lecithin from vegetable raw materials consisting in extracting the said raw materials by a solvent-mixture of alcohol with an addition of 10 to 80 per cent of volatile liquid hydrocarbon solvent, in adding to the extract thus obtained a fatty oil, in warming up this mixture until the solvent-mixture is mainly evaporated, in separating the remaining oil from its deposit, in passing water-vapor into the oil in order to set free the lecithin, in separating the lecithin, and in freeing the latter from any oil sticking thereto.

9. Process of obtaining lecithin from vegetable raw materials consisting in extracting the said raw materials by a solvent-mixture of 2 parts of alcohol and 3 parts of benzol, in warming up the extract thus obtained until the solvent-mixture is mainly evaporated, in separating the remaining oil from its deposit, in passing water-vapor into the oil in order to set free the lecithin, in separating the lecithin, and in freeing the latter from any oil sticking thereto.

10. Process of obtaining lecithin from vegetable raw materials consisting in extracting the said raw materials by a solvent-mixture of 2 parts of alcohol and 3 parts of volatile liquid hydrocarbon solvent, in warming up the extract thus obtained until the solvent-mixture is mainly evaporated, in separating the remaining oil from its deposit, in passing water-vapor into the oil in order to set free the lecithin, in separating the lecithin, and in freeing the latter from any oil sticking thereto.

11. Process of obtaining lecithin from vegetable raw materials consisting in extracting the said raw materials by a solvent-mixture of 2 parts of alcohol and 3 parts of benzol, in adding to the extract thus obtained a fatty oil, in warming up this mixture until the solvent-mixture is mainly evaporated, in separating the remaining oil from its deposit, in passing water-vapor into the oil in order to set free the lecithin, in separating the lecithin, and in freeing the latter from any oil sticking thereto.

12. Process of obtaining lecithin from vegetable raw materials consisting in extracting the said raw materials by a solvent-mixture of 2 parts of alcohol and 3 parts of volatile liquid hydrocarbon solvent, in adding to the extract thus obtained a fatty oil of a drying nature, in warming up this mixture until the solvent-mixture is mainly evaporated, in separating the remaining oil from its deposit, in passing water-vapor into the oil in order to set free the lecithin, in separating the lecithin, and in freeing the latter from any oil sticking thereto.

In testimony that I claim the foregoing as my invention, I have signed my name.

HERMANN BOLLMANN. [L. S.]